(12) United States Patent
Mazahir (10) Patent No.: US 10,469,558 B2
(45) Date of Patent: Nov. 5, 2019

(54) WEBSITE SERVER REQUEST REROUTING

(71) Applicant: Microsoft Corporation, Redmond, WA (US)

(72) Inventor: Osama Mazahir, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 13/865,199

(22) Filed: Apr. 18, 2013

(65) Prior Publication Data

US 2014/0317238 A1 Oct. 23, 2014

(51) Int. Cl.
*G06F 15/16* (2006.01)
*H04L 29/08* (2006.01)
*G06F 16/958* (2019.01)

(52) U.S. Cl.
CPC ............ *H04L 67/02* (2013.01); *G06F 16/958* (2019.01)

(58) Field of Classification Search
CPC .................................. G06F 15/16; H04L 67/02
See application file for complete search history.

(56) References Cited

U.S. PATENT DOCUMENTS

| | | | | |
|---|---|---|---|---|
| 6,701,343 B1 * | 3/2004 | Kenyon | ................ | G06F 16/958 709/204 |
| 2004/0024775 A1 * | 2/2004 | Kemp | .................... | G06F 16/93 |
| 2004/0044760 A1 * | 3/2004 | Deily | .................... | G06F 16/972 709/223 |
| 2010/0182086 A1 | 7/2010 | Cozzolino | | |
| 2010/0186086 A1 * | 7/2010 | Guzner | ............... | H04L 63/0823 726/22 |
| 2011/0302510 A1 * | 12/2011 | Harrison | ............. | G06F 17/2247 715/760 |
| 2012/0281708 A1 | 11/2012 | Chauhan et al. | | |
| 2013/0007114 A1 | 1/2013 | Wee et al. | | |
| 2013/0007216 A1 | 1/2013 | Fries et al. | | |
| 2015/0193394 A1 * | 7/2015 | Peters | ................. | G06F 16/9574 715/234 |

FOREIGN PATENT DOCUMENTS

| | | |
|---|---|---|
| CN | 1791034 A | 6/2006 |
| CN | 102571934 A | 7/2012 |

OTHER PUBLICATIONS

"International Search Report & Written Opinion for PCT Patent Application No. PCT/US2013/060766", dated Dec. 4, 2013, Filed Date: Sep. 20, 2013, 9 Pages.

(Continued)

*Primary Examiner* — Suraj M Joshi
*Assistant Examiner* — Jaren Means
(74) *Attorney, Agent, or Firm* — Rainier Patents, P.S.

(57) ABSTRACT

In one embodiment, a server administrator 122 for a website server 120 may inspect an initial website request to determine if a dormant website 128 is to be brought out of dormant website storage 126. A request queue 308 may hold an initial website request for a website in an inspection stage 430 at a website server 120. A configuration manager 312 may determine a website presentation state for the website. The configuration manager 312 may pass the initial website request to the website when the website is available.

20 Claims, 7 Drawing Sheets

(56) References Cited

OTHER PUBLICATIONS

Dragoi, Octavian Andrei, "The Conceptual Architecture of the Apache Web Server", Retrieved at: <<http://www.shoshin.uwaterloo.ca/~oadragoi/cw/CS746G/a1/apache_conceptual_arch.html>>, Jan. 26, 1999, pp. 10.

Skonnard, Aaron, "A Developer's Guide to Service Bus in Windows Azure platform AppFabric", Retrieved at <<http://download.microsoft.com/download/F/D/8/FD863D17-E85E-478C-B06F-6825D50EA103/A%20Developer%27s%20Guide%20to%20Service%20Bus%20in%20Windows%20Azure%20platform%20AppFabric.docx>>, Nov. 2009, pp. 48.

"Stingray Traffic Manager", Retrieved at <<http://www.riverbed.com/us/products/stingray/stingray_tm.php>>, Retrieved Date: Apr. 4, 2013, pp. 17.

"Application Delivery Controller Performance Report", Retrieved at <<http://bradreese.com/f5-cisco-citrix.pdf>>, Retrieved Date: Apr. 4, 2013, pp. 17.

"Configuring Cisco Cloud Web Security", Retrieved at <<http://www.cisco.com/en/US/docs/security/asa/asa91/asdm71/firewall/protect_cloud_web_security.html>>, Retrieved Date: Apr. 4, 2013, pp. 14.

"Troubleshooting HTTPS Inspection", Retrieved at <<http://technet.microsoft.com/en-us/library/ee796230.aspx>>, Nov. 15, 2009, pp. 7.

Office action by EPO in counterpart EP application 13 771 313.7, published Mar. 7, 2017.

"First Office Action and Search Report Issued in Chinese Patent Application No. 201380075683.0", dated Jan. 30, 2018, 19 Pages.

"Office Action Issued in European Patent Application No. 13771313.7", dated Mar. 26, 2018, 9 Pages.

"Second Office Action Issued in Chinese Patent Application No. 201380075683.0", dated Oct. 9, 2018, 12 Pages.

\* cited by examiner

WEBSITE SERVER REQUEST REROUTING

BACKGROUND

A website server may store multiple websites. Each of these websites may be accessed sporadically, with long periods between accesses. A hypertext transfer protocol server may be statically configured with the websites in order to appropriately handle incoming requests. Thus, the hypertext transfer protocol server may have the website easily identifiable upon receiving an initial website request. Otherwise, the hypertext transfer protocol server may not react properly to an initial website request for a website that is not currently configured for presentation by the server.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to inspecting an initial website request to determine if a dormant website is to be brought out of dormant website storage. A request queue may hold an initial website request for a website in an inspection stage at a website server. A configuration manager may determine a website presentation state for the website. The configuration manager may pass the initial website request to the website when the website is available.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a server administrator.

To conserve space, a server may move the website into storage, to provide resource availability to other websites. Once a website has been moved to storage, an initial website request for that website may cause the website to go through an activation process. Previously, the activation process consumed the initial website request, so that the server had to create a simulation of the initial website request to perform the request functions upon the activation of the website.

By adding an inspection stage for incoming initial website requests, a server administrator may dynamically trap a request for a new website, check the availability of that website, and lazily load the configuration for that website. The inspection stage may allow a website server to be over-provisioned for many more websites than actually intended to serve because, in reality, only a small fraction of those websites may be accessed in a given time period.

Further, with load-balanced collections of servers, a load balancer may have less intelligence since traffic handled by a failed website server may be redirected to other website servers without reconfiguring the new target website server. Since the servers are not statically configured, a load balancer may redirect requests to a different target website server. The target website server may dynamically find and load the website.

When a hypertext transfer protocol website server receives an initial website request from a client device, the hypertext transfer protocol website server stack determines the application to receive the initial website request. Moreover, when the initial website request is routed to the application, the stack may apply one-time policies to the request, such as authentication, or may cause the request to be rejected. Therefore, in order for correctness and security, a request may be delivered to an application once.

The configuration manager may analyze the initial website request before delivering the initial website request to the target application. Effectively, the server administrator may add an inspection stage to the hypertext transfer protocol request processing pipeline. A configuration manager component of the server administrator may inspect the initial website request independent of target application policies. Since policies are not applied during the inspection stage, a policy conflict between the originally destination application and the resultant destination application may be avoided.

A website server may run multiple web server sessions. The server administrator may allow those processes that may access the request queue to act as an inspection stage. The request queue is an access controlled object with the security access configured by the queue creator, designating who may work on the request queue. Thus, the configuration manager, as the queue creator, may configure the queue to limit inspection capability for the request queue. Since the request queue may contain initial website requests that may be served by components that can attach to the request queue, the inspection stage may inspect just those requests that may be served by the configuration manager.

When the inspection stage picks up the initial website request, the inspection stage may scan a website database to determine whether to load website data. If the initial website request is for a website that has not been accessed recently, then the inspection stage may load the website data and configure the website, plumbing a new mapping into the hypertext transfer protocol kernel stack. Upon completion, the inspection stage may notify the hypertext transfer protocol server stack that inspection is complete and that the website request may be reprocessed. At this point, the server administrator may rescan the list of registered websites and find the destination application for the hypertext transfer protocol website request. If the inspection stage finds that the website data has already been loaded, then the inspection stage may notify the server administrator that inspection is complete and that the request processing may continue. The server administrator may apply policies and deliver the request to the destination application. Alternately, the inspection stage may indicate, upon inspection completion, that the website is nonexistent.

The inspection stage may dynamically load and configure the website, after the hypertext transfer protocol website request arrives, in a seamless manner completely transparent to the application. Subsequent hypertext transfer protocol requests may circumvent the inspection stage as the configuration has been plumbed. The server administrator may then act as a statically pre-configured server.

Thus, in one embodiment, a server administrator for a website server may inspect an initial website request to determine if a dormant website is to be brought out of a dormant website storage. A request queue may hold an initial website request for a website in an inspection stage at a website server. A configuration manager may determine a website presentation state for the website. The configuration manager may pass the initial website request to the website when the website is available.

Figure 1:
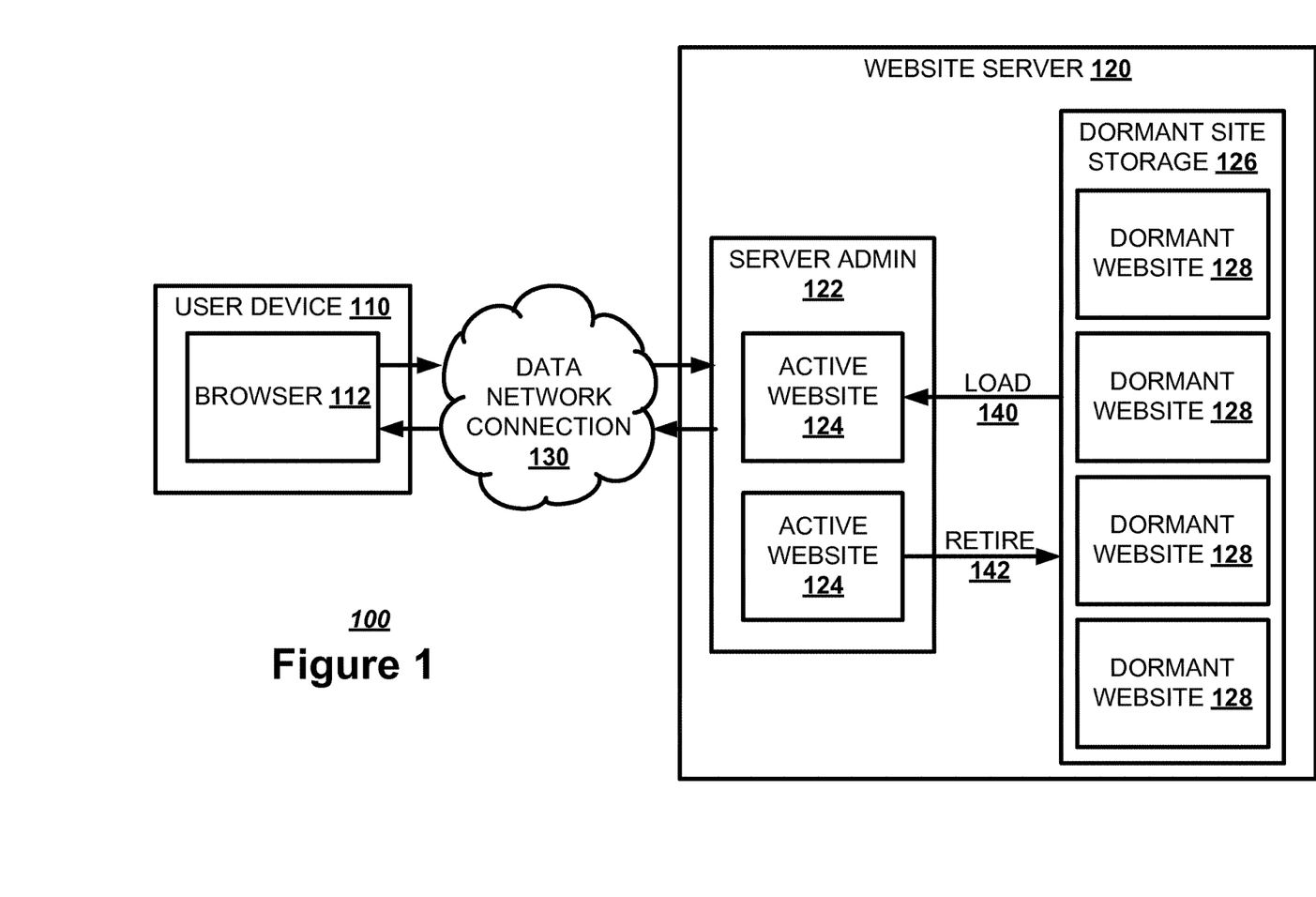
FIG. 1 illustrates, in a block diagram, one embodiment of a data network.

FIG. 1 illustrates, in a block diagram, one embodiment of a data network 100. A user device 110 may operate a browser 112 that connects to a website server 120 via a data network connection 130. A user device 110 may be a desktop computer, a laptop computer, a tablet computer, or a hand-held "smart phone". The data network connection 130 may be an internet connection, a wide area network connection, a local area network connection, or other type of data network connections.

The website server 120 may provide access to one or more websites. A website is a set of one or more related web pages accessible via a single web domain. A website may provide data, as well as native applications. A website server 120 may be located on a single server or distributed over multiple servers acting as a single server for a website. The website server 120 may use a server administrator 122 to maintain some websites as active websites 124, ready to receive requests from a browser 112 without loading from data storage prior to transmission of the stored data. The website server 120 may store websites that have not been active for a set dormancy period in a dormant website storage 126 as dormant websites 128. The server administrator 122 may load 140 a dormant website 128 upon an initial website request from the browser 112, converting the dormant website 128 into an active website 124. Alternatively, the server administrator 122 may retire 142 an active website that has not been accessed for a dormancy period, converting the active website 124 into a dormant website 128.

Figure 2:
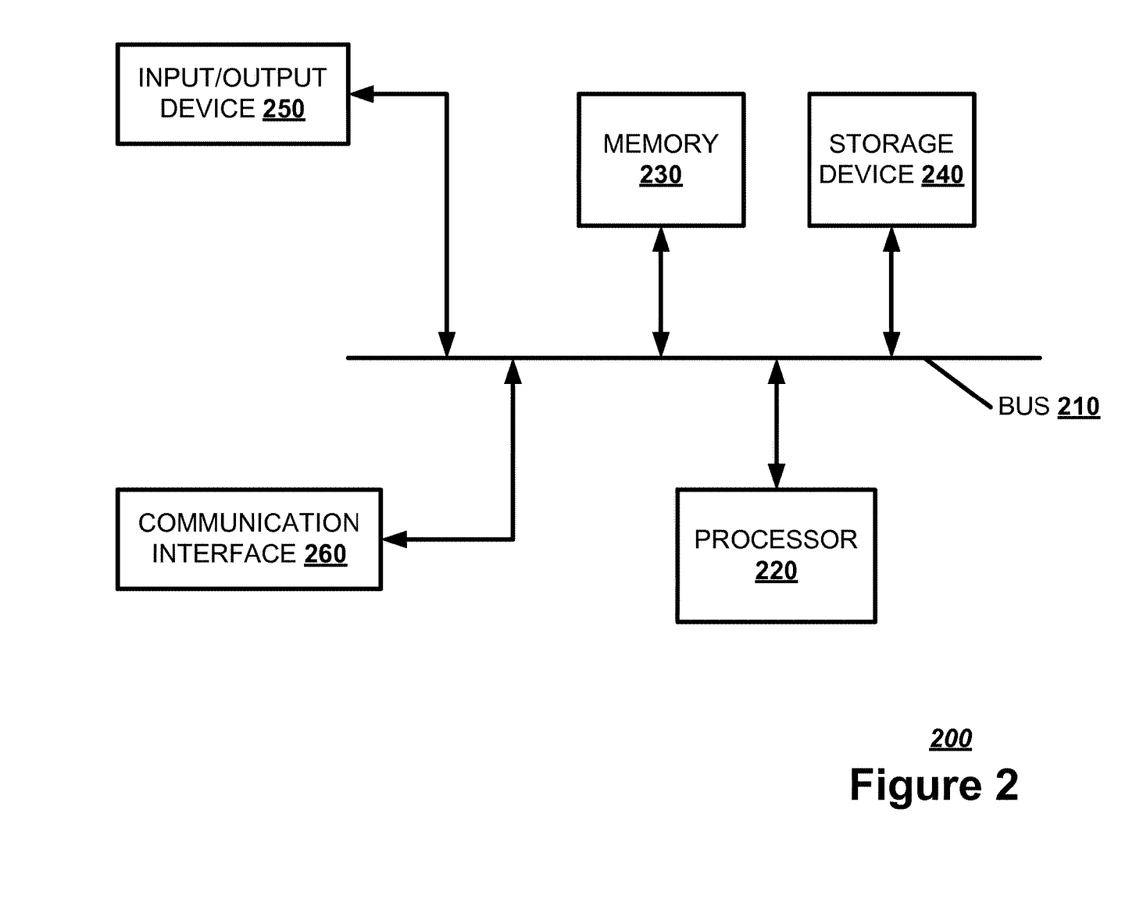
FIG. 2 illustrates, in a block diagram, one embodiment of a computing device.

FIG. 2 illustrates a block diagram of an exemplary computing device 200 which may act as a user device 110 or a website server 120. The computing device 200 may combine one or more of hardware, software, firmware, and system-on-a-chip technology to implement a user device 110 or a website server 120. The computing device 200 may include a bus 210, a processor 220, a memory 230, a data storage 240, an input/output device 250, and a communication interface 260. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing dormant websites 128.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may include a network interface or a transceiver interface. The communication interface 260 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
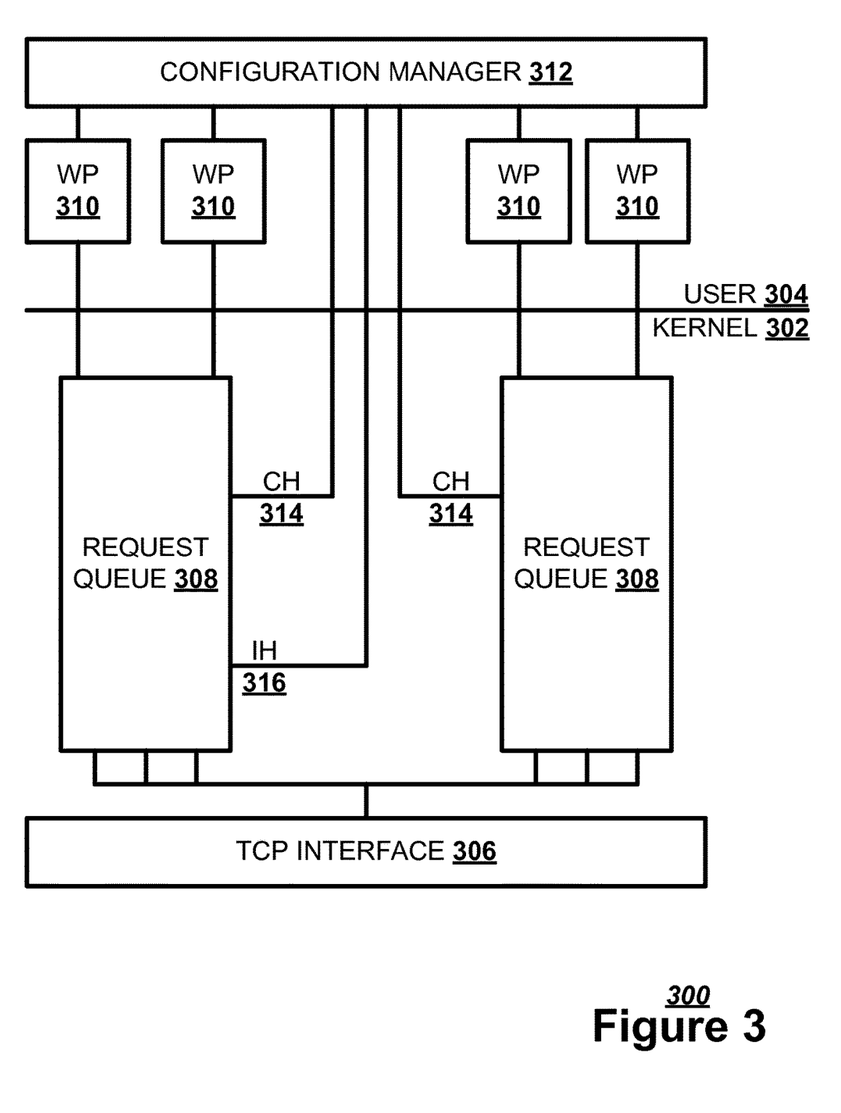
FIG. 3 illustrates, in a block diagram, one embodiment of a software architecture for the server administrator.

FIG. 3 illustrates, in a block diagram, one embodiment of a software architecture 300 for the server administrator 122. The software architecture 300 may have components at both the kernel level 302 and the user level 304. A component at the kernel level 302 has access to operating system level resources. At the kernel level 302, a transmission control protocol (TCP) interface 306 may receive an initial website request from the data network connection 130. The transmission control protocol interface 306 may pass the initial website request to the request queue 308 to hold in an inspection stage before processing by an available worker process (WP) 310 at the user level 304.

A component at the user level 304 has access to application level resources, using hypertext transfer protocol (HTTP). A configuration manager 312 may access the initial website request in the request queue 308. The configuration manager 312 may manage the worker processes 310 based on information in the initial website request. The worker process 310 may open an input output handle to access an initial website request in the request queue 308. The configuration manager 312 may open a controller handle (CH) 314 to manage the request queue 308. Additionally, the configuration manager 312 may open an inspection handle (IH) 316 to execute an inspection stage in the request queue 308.

The configuration manager 312 may open an inspection handle 316 via a pre-existing application programming interface (API), such as the interface used to create the request queue 308. The configuration manager 312 may indicate an inspection handle 316 using an additional bit-flag. The configuration manager 312 may open an inspection handle 316 at any time during the lifetime of the request queue 308. The request queue 308 may be destroyed when each handle to the request queue 308 has been closed. Upon the creation of an inspection handle 316, the configuration manager 312 may route each successive request through the inspection handle 316. The configuration manager 312 may specify a security descriptor for the request queue 308. Any process that attempts to open the request queue 308 may be checked against the security descriptor.

Figure 4:
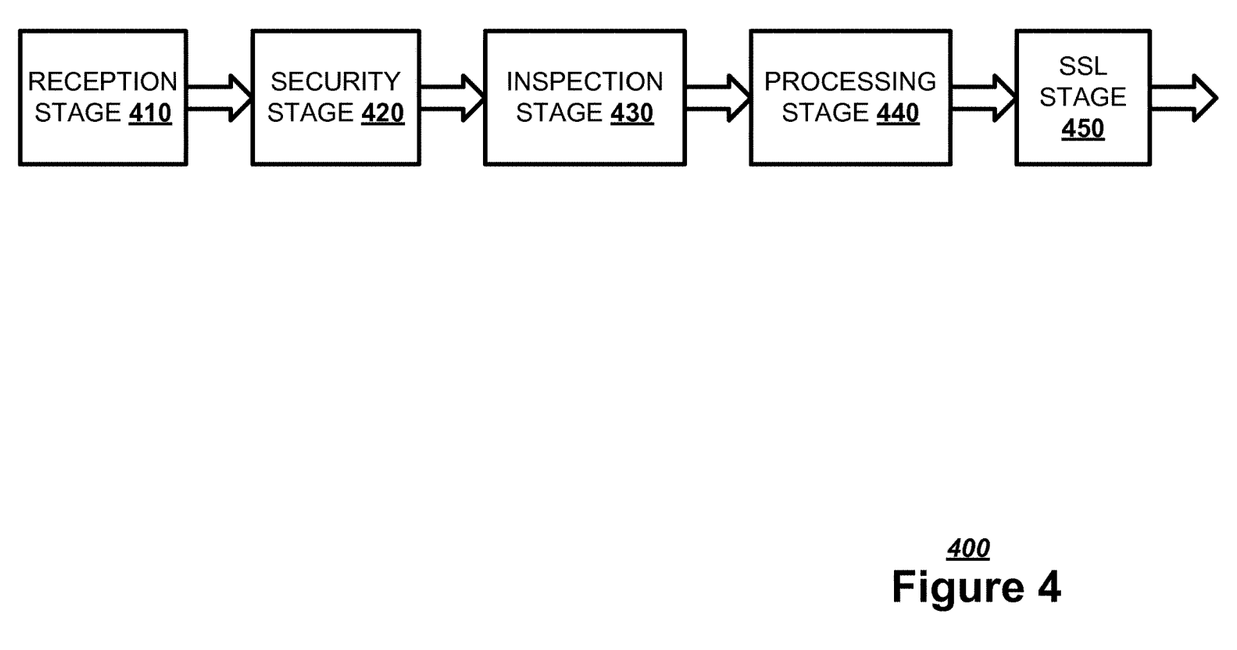
FIG. 4 illustrates, in a block diagram, one embodiment of a process architecture for the server administrator.

FIG. 4 illustrates, in a block diagram, one embodiment of a process architecture 400 for the server administrator 122. During a reception stage 410, the transmission control protocol interface 306 may receive an initial website request from the browser 112 of a user device 110 via the transmission control protocol interface 306. In the security stage 420, the configuration manager 312 may inspect a security certificate of the initial website request. In the inspection stage 430, the configuration manager 312 may hold the initial website request in the request queue 308 while determining a website presentation state for the requested website. The website presentation state describes the readiness of a website to be presented to the user. For example, a website presentation state may be dormant when in storage, active when ready for presentation, or invalid if not present anywhere on the server. Once a requested website has been loaded, the initial website request may move from the inspection stage 430 to the processing stage 440.

The processing stage 440 may use the worker processes 310 to prepare the initial website request for transmission in the secure sockets layer (SSL) stage 450. The secure sockets layer stage 450 may authenticate the website server 120, so that the client device 110 may confirm communication with the intended website server 120. The secure sockets layer stage 450 may encrypt the traffic to protect data exchanges between the client device 110 and the website server 120. Additionally, the secure sockets layer 450 may protect the data traffic to prevent modification by an intermediary.

In order for the website server 120 to allow the client device 110 access to data, often the website server 120 may ask the client device 110 to authenticate to the website server 120 after establishing the secure sockets layer connection. Executing this authentication over an internet connection may occur at the hypertext markup language (HTML) level, by having the client fill a form on a web page with a user name and password. Executing this authentication over an intranet connection may occur at the hypertext transfer protocol level, exchanging the authentication data between the client device 110 and website server 120. For both internet and intranet communications, the client device 110 may execute an authentication at the secure socket layer level by providing a certificate proving the client identity to the website server 120. The client device may store this certificate on a smart card, with the certificate released upon entry of a password or personal identification number. This dual confirmation process may increase the security of the authentication process. As the inspection stage 430 allows the original initial website request to be processed by the processing stage 440, the website server 120 may use the secure socket layer stage 450 with the client device 110 uninterrupted. The website server 120 may successfully request and receive the client certificate, allowing for a secure communication.

Figure 5:
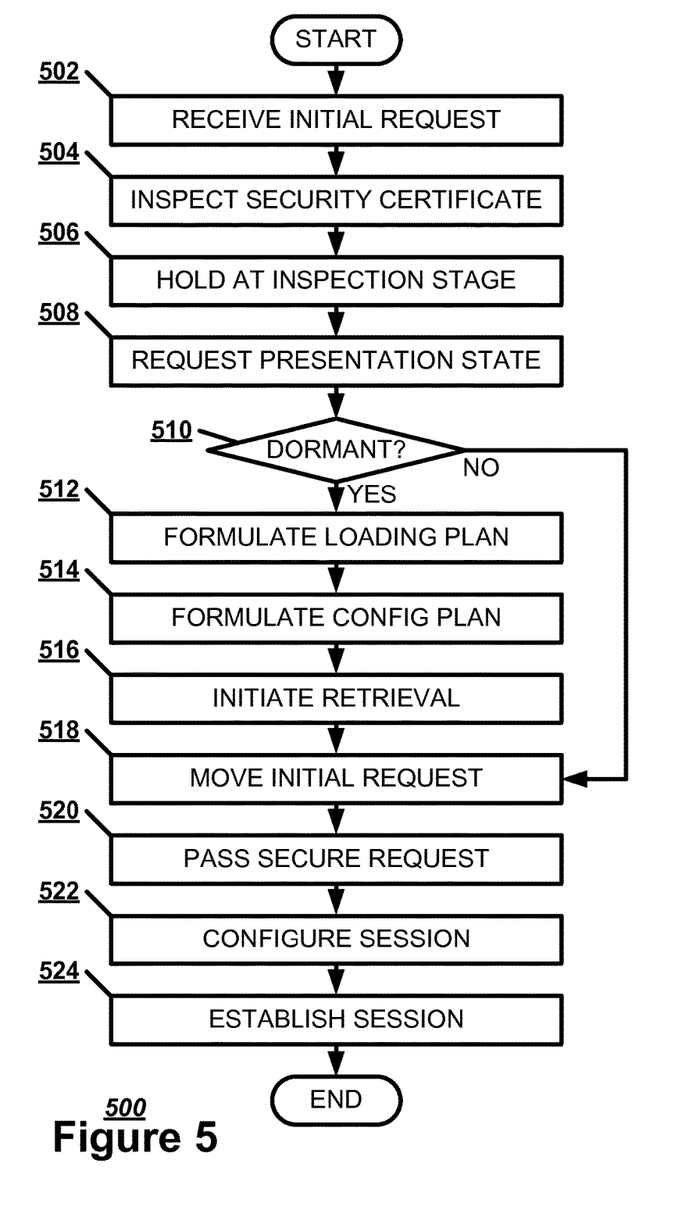
FIG. 5 illustrates, in a flowchart, one embodiment of a method of processing an initial website request at the kernel level.

FIG. 5 illustrates, in a flowchart, one embodiment of a method 500 of processing an initial website request at the kernel level 302. The server administrator 122 may receive an initial website request for a website at a website server 120 at a request queue 308 (Block 502). The server administrator 122 may inspect the security certificate prior to the inspection stage 430 (Block 504). The server administrator 122 may hold the initial website request for the website in an inspection stage 430 at the website server 120 (Block 506). The server administrator 122 may request the website presentation state for the website (Block 508). If the website is a dormant website 128 (Block 510), the server administrator 122 may formulate a loading plan for loading the dormant website 128 in response to the initial website request (Block 512). The server administrator 122 may formulate a configuration plan for configuring the website in response to the initial website request (Block 514). The server administrator 122 may initiate a retrieval of a dormant website 128 from a dormant website storage 126 (Block 516). The server administrator 122 may move the initial website request to a processing stage 440 when the website presentation state is determined (Block 518).

If the initial website request is a secure client request, the server administrator 122 may pass a secure client request through a secure sockets layer channel (Block 520). The server administrator 122 may verify the identity of the client by processing the original initial website request and the original secure socket layer connection. The server administrator 122 may perform the client verification checks after the website is lazily loaded and the worker process 310 receives the initial website request. The server administrator 122 may configure a website session based on the initial website request to process additional website requests from the client device 110 after the initial website request (Block 522). The server administrator 122 may establish a website session with a user to bypass the inspection stage 430 after the initial website request (Block 524).

Figure 6:
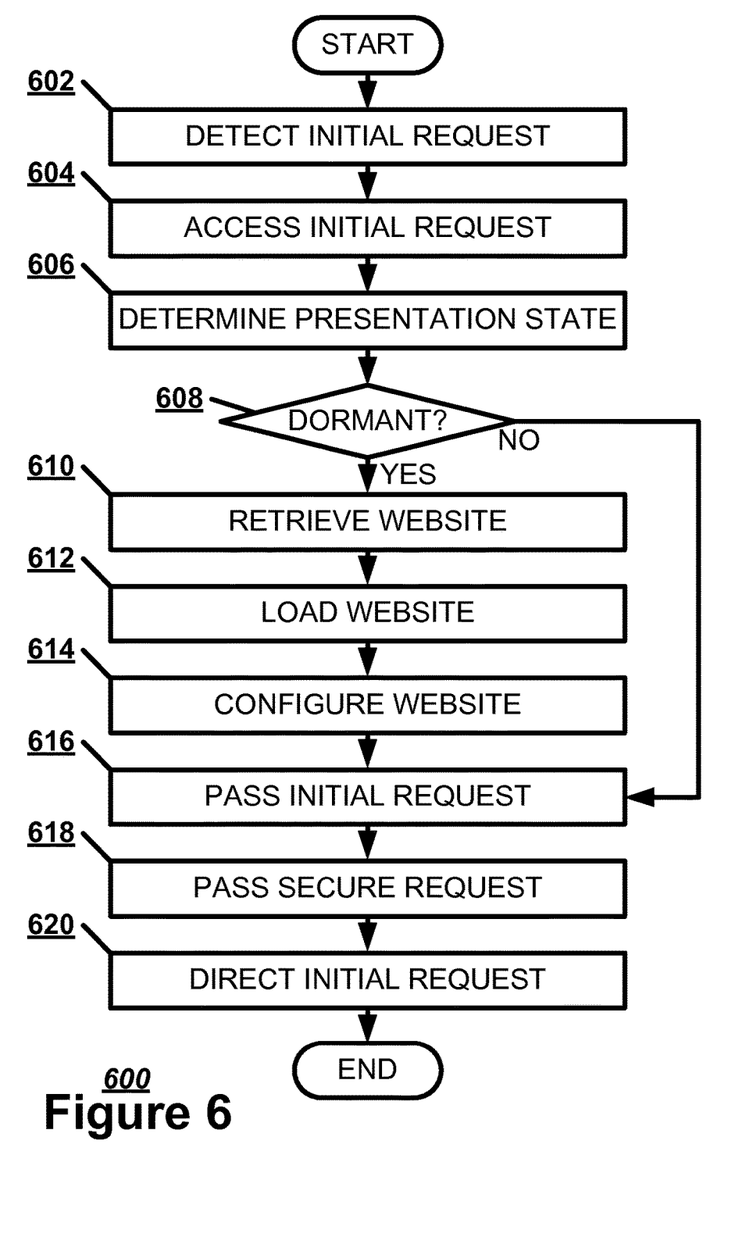
FIG. 6 illustrates, in a flowchart, one embodiment of a method of processing an initial website request at the user level.

FIG. 6 illustrates, in a flowchart, one embodiment of a method 600 of processing an initial website request at the user level 304. The configuration manager 312 may detect an initial website request for a website in an inspection stage 430 at a website server 120 (Block 602). The configuration manager 312 may access the initial website request at a request queue 308 (Block 604). The configuration manager 312 may determine a website presentation state for the website (Block 606). If the website is a dormant website 128 (Block 608), the configuration manager 312 may retrieve a dormant website 128 from a dormant website storage 126 (Block 610). The configuration manager 312 may load 140 a dormant website 126 on an ad hoc basis, or lazily load, based on the initial website request (Block 612). The configuration manager 312 may load sections of the website initially requested by the initial website request, adding the other sections during lulls in the server activity. The configuration manager 312 may configure the website based on the initial website request (Block 614). The configuration manager 312 may pass the initial website request to the website when the website is available (Block 616). If the initial website request is a secure client request, the configuration manager 312 may pass a secure client request through a secure sockets layer channel (Block 618). The configuration manager 312 may direct the initial website request to an application of the website based on the initial website request (Block 620).

Figure 7:
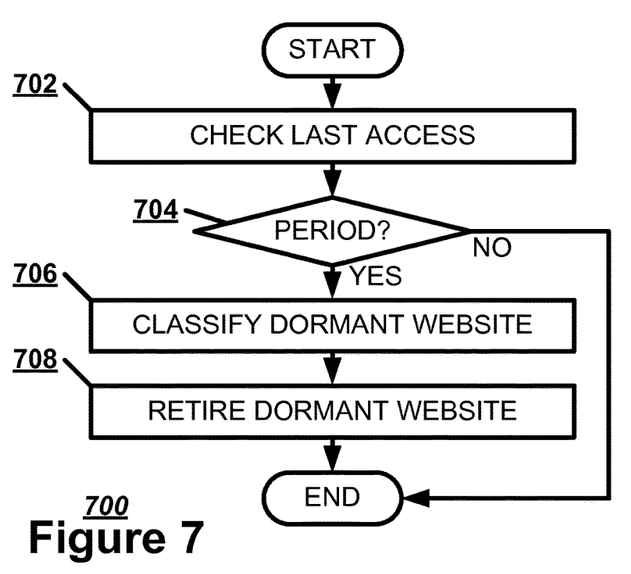
FIG. 7 illustrates, in a flowchart, one embodiment of a method of moving a website into dormant website storage.

FIG. 7 illustrates, in a flowchart, one embodiment of a method 700 of retiring a website into dormant website storage 126. The configuration manager 312 may check the last time that a website has been accessed (Block 702). If the website has not been accessed after a dormancy period (Block 704), the configuration manager 312 may classify the website as a dormant website 128 to be stored in a dormant website storage 126 (Block 706). The configuration manager 312 may retire 142 the dormant website 128 to the dormant website storage 126 (Block 708).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:
1. A method, comprising:
 receiving, from a client device, an initial website request to access a website;
 in response to receiving the initial website request to access the website, dynamically trapping the initial website request in an inspection stage and determining whether the website is in an active state or a dormant state;
 in response to determining that the website is in the dormant state, converting the website from the dormant state to the active state;
 moving the initial website request to a processing stage when the website is in the active state;
 establishing a website session with the client device;
 receiving a subsequent website request to access the website from the client device within the website session; and
 responsive to receiving the subsequent website request, moving the subsequent website request to the processing stage by bypassing the inspection stage and skipping determining whether the website is in the active state or the dormant state.
2. The method of claim 1, further comprising:
 requesting a website presentation state for the website, the website presentation state being one of a plurality of states including the active state and the dormant state.
3. The method of claim 1, further comprising:
 holding the initial website request in a request queue while the initial website request is in the inspection stage; and
 accessing the initial website request from the request queue.
4. The method of claim 1, further comprising:
 inspecting a security certificate associated with the initial website request before the initial website request is placed in the inspection stage.
5. The method of claim 1, wherein the initial website request is a secure client request, the method further comprising:
 routing the secure client request through a secure sockets layer channel.
6. The method of claim 1, further comprising:
 formulating a loading plan for loading the website in the dormant state in response to the initial website request; and
 loading the website in the dormant state from a dormant website storage according to the loading plan.
7. The method of claim 1, further comprising:
 formulating a configuration plan for configuring the website in response to the initial website request; and configuring the website according to the configuration plan.

8. The method of claim 1, further comprising:
configuring the website session based at least on the initial website request to process additional website requests.

9. The method of claim 1, wherein converting the website from the dormant state to the active state comprises:
retrieving at least a portion of the website from a dormant website storage.

10. A system, comprising:
one or more hardware processors; and
at least one computer readable storage medium including instructions which, when executed by the one or more hardware processors, cause the one or more hardware processors to:
detect an initial website request from a client device to access a website, the initial website request being dynamically trapped in an inspection stage when the initial website request is received;
determine whether the website is in an active state or a dormant state in response to detecting the initial website request in the inspection stage;
convert the website from the dormant state to the active state in response to determining that the website is in the dormant state;
route the initial website request to the website when the website is in the active state;
establish a website session with the client device;
detect an additional website request to access the website from the client device within the website session; and
responsive to detecting the additional website request, route the additional website request to the website by bypassing the inspection stage and skipping determining whether the website is in the active state or the dormant state.

11. The system of claim 10, wherein the initial website request is a secure client request and the instructions, when executed by the one or more hardware processors, cause the one or more hardware processors to:
route the secure client request through a secure sockets layer channel.

12. The system of claim 10, wherein the instructions, when executed by the one or more hardware processors, cause the one or more hardware processors to:
hold the initial website request in a request queue; and
access the initial website request from the request queue.

13. The system of claim 10, wherein the instructions, when executed by the one or more hardware processors, cause the one or more hardware processors to:
retire the website as a dormant website to be stored in a dormant website storage when the website is not accessed for at least a dormancy period.

14. The system of claim 10, wherein the instructions, when executed by the one or more hardware processors, cause the one or more hardware processors to:
load the website in the dormant state on an ad hoc basis based at least on the initial website request.

15. The system of claim 10, wherein the instructions, when executed by the one or more hardware processors, cause the one or more hardware processors to:
formulate a configuration plan for configuring the website based at least on the initial website request; and
configure the website according to the configuration plan.

16. The system of claim 10, wherein the instructions, when executed by the one or more hardware processors, cause the one or more hardware processors to:
direct the initial website request to an application of the website based at least on the initial website request.

17. The system of claim 10, wherein the instructions, when executed by the one or more hardware processors, cause the one or more hardware processors to:
retrieve at least a portion of the website from a dormant website storage.

18. A website server, comprising:
a storage having stored therein a website that has not been active for at least a dormancy period;
a hardware communication interface configured to receive an initial website request to access the website from a client device and to receive a subsequent website request to access the website from the client device; and
at least one hardware processor configured via computer-readable instructions to:
in response to receiving the initial website request, dynamically trap the initial website request in an inspection stage and determine whether the website is in a dormant state or an active state;
in response to determining that the website is in the dormant state, convert the website from the dormant state to the active state;
route the initial website request to the website when the website is in the active state;
establish a website session with the client device; and
in response to receiving the subsequent website request to access the website from the client device within the website session, route the subsequent website request to the website by bypassing the inspection stage and skipping determining whether the website is in the active state or the dormant state.

19. The website server of claim 18, further comprising:
a request queue that holds the initial website request in the inspection stage.

20. The website server of claim 18, wherein the at least one hardware processor is further configured via the computer-readable instructions to:
retire an active website that has not been accessed for at least the dormancy period into a dormant website stored in the storage.

* * * * *